US012798437B2

(12) United States Patent
Cao

(10) Patent No.: US 12,798,437 B2
(45) Date of Patent: Nov. 17, 2026

(54) DIRECT-CURRENT POWER SUPPLY SYSTEM AND BATTERY MODULE CHARGING SYSTEM THEREFOR

(71) Applicant: INNOPOWER (ZHENGZHOU) TECHNOLOGY CO., LTD., Zhengzhou (CN)

(72) Inventor: Xijun Cao, Zhengzhou (CN)

(73) Assignee: INNOPOWER (ZHENGZHOU) TECHNOLOGY CO. LTD., Zhengzhou (CN)

( * ) Notice: Subject to any disclaimer, the term of this patent is extended or adjusted under 35 U.S.C. 154(b) by 886 days.

(21) Appl. No.: 18/246,992

(22) PCT Filed: Sep. 15, 2021

(86) PCT No.: PCT/CN2021/118465

§ 371 (c)(1),
(2) Date: Mar. 28, 2023

(87) PCT Pub. No.: WO2022/068588

PCT Pub. Date: Apr. 7, 2022

(65) Prior Publication Data

US 2023/0365025 A1 Nov. 16, 2023

(30) Foreign Application Priority Data

Oct. 1, 2020 (CN) ......................... 202011066609.0

(51) Int. Cl.
*H01M 10/46* (2006.01)
*B60L 53/65* (2019.01)
(Continued)

(52) U.S. Cl.
CPC ............... *B60L 58/18* (2019.02); *B60L 53/65* (2019.02); *B60L 53/665* (2019.02); *B60L 2240/64* (2013.01); *B60L 2260/46* (2013.01)

(58) Field of Classification Search
CPC .. H02J 7/00; Y02T 90/12; Y02T 10/70; Y02T 10/7072; B60L 53/65; B60L 53/665; B60L 2260/46; B60L 2240/64
(Continued)

(56) References Cited

U.S. PATENT DOCUMENTS

2016/0075254 A1 3/2016 Chang et al.
2016/0082859 A1* 3/2016 Yang ...................... B60L 58/19 701/22
(Continued)

FOREIGN PATENT DOCUMENTS

CN 104903141 A 11/2013
CN 106033901 A 10/2016
(Continued)

OTHER PUBLICATIONS

International Search Report for PCT Application No. PCT/CN2021/118465; China National Intellectual Property Administration; Beijing, China; date of mailing Dec. 1, 2021.
(Continued)

*Primary Examiner* — Edward Tso
(74) *Attorney, Agent, or Firm* — Thomas E. Lees, LLC

(57) ABSTRACT

A DC power supply system includes a fixed battery pack unit and a variable battery pack unit. The variable battery pack unit includes a plurality of battery modules, a base having a plurality of battery mounting positions, a power supply mode switching module with selector switches and a switch controller, an external data exchange module connected to an electronic control unit of a moving equipment, and a battery control module. The battery control module is connected with the external data exchange module and the switch controller, and dynamically selects one or more of the battery modules to place them in an operating state based on information input from the external data exchange module.

21 Claims, 10 Drawing Sheets

(51) Int. Cl.
*B60L 53/66* (2019.01)
*B60L 58/18* (2019.01)

(58) Field of Classification Search
USPC ........ 320/104, 107, 109, 114, 132, 149, 112
See application file for complete search history.

(56) References Cited

U.S. PATENT DOCUMENTS

| | | | | |
|---|---|---|---|---|
| 2018/0212440 | A1 | 7/2018 | Depond | |
| 2019/0372065 | A1* | 12/2019 | Kawata | H01M 50/264 |
| 2020/0006969 | A1* | 1/2020 | Penilla | B60L 1/003 |
| 2022/0136474 | A1* | 5/2022 | Ostrowski | G06N 3/08 123/179.4 |

FOREIGN PATENT DOCUMENTS

| | | | |
|---|---|---|---|
| CN | 107472054 | A | 12/2017 |
| CN | 110271434 | A | 3/2019 |
| JP | H11252711 | A | 9/1999 |
| JP | 2008278740 | A | 11/2008 |
| JP | 2010213555 | A | 9/2010 |
| JP | 2010259233 | A | 11/2010 |
| JP | 2013176213 | A | 9/2013 |
| JP | 2015165731 | A | 9/2015 |
| JP | 2018030581 | A | 3/2018 |
| JP | 2019081467 | A | 5/2019 |
| WO | 2019060521 | A1 | 3/2019 |

OTHER PUBLICATIONS

Written Opinion of the International Searching Authority for PCT Application No. PCT/CN2021/118465; China National Intellectual Property Administration; Beijing, China; date of mailing Dec. 1, 2021.

Japanese first Office action for Japanese Patent Application No. 2023-519327; Japan Patent Office; Tokyo, Japan; dated Aug. 25, 2023.

* cited by examiner

DIRECT-CURRENT POWER SUPPLY SYSTEM AND BATTERY MODULE CHARGING SYSTEM THEREFOR

CROSS-REFERENCE TO RELATED APPLICATIONS

This application is a national stage entry under 35 USC § 371 (b) of PCT International Application No. PCT/CN2021/118465, filed on Sep. 15, 2021, and claims the benefit of Chinese Patent No. 202011066609.0, filed on Oct. 1, 2020, which are expressly incorporated by reference herein.

BACKGROUND

The invention belongs to the field of power supply, relates to a DC power supply system, and in particular, to a DC power supply system carried on moving equipment.

The energy problem has been a major problem troubling human development for a long time. With the development of science and technology and the improvement of human living standards, people's demand for primary energy is increasing. At present, oil, as the main energy source, provides power for various moving equipment such as motorcycles, automobiles, ships, and airplanes. However, the storage capacity of oil as a primary energy is fixed, and the shortage of oil is a common problem faced by all countries in the world. In addition, the emission of carbon dioxide and sulfide generated after the combustion of oil products is also the main cause of environmental pollution and climate change.

In recent years, people have been exploring new energy sources to replace oil products as the power of vehicles, ships and aircrafts. In the field of electric vehicles, rechargeable batteries as power sources are being increasingly valued by major automobile manufacturers.

However, after years of development, electric vehicles still have a lower market share than fuel vehicles. The problems hindering the popularity of electric vehicles are the short driving range and the long charging time of batteries. At present, the driving range of various types of electric vehicles on the market is 250~600 kilometers, which is a problem of range anxiety for users of long-distance interstate travel. In a fast-paced journey, it is also unbearable for drivers to stop and wait for an hour to recharge. At the same time, charging stations are not as ubiquitous as gas stations. In fact, due to the scarcity of charging stations and the uncertainty of finding a charging pile, most drivers begin to worry about the driving range when the endurance mileage is 100~150 kilometers. At ordinary times, car owners who do not have charging piles in their parking spaces start to look for charging piles when the endurance mileage has just dropped below 100 kilometers. Therefore, in this sense, the current effective range of electric vehicles is only 200~400 kilometers.

For taxi drivers, if they use electric vehicles as taxis, they need to spend a lot of time looking for charging stations or waiting for charging, which will take up the time for carrying guests, so it is difficult to popularize electric vehicles in the taxi field. In other words, the limited battery endurance and the inconvenience of charging are the main reasons that hinder the popularity of electric vehicles.

For the above reasons, although electric vehicles work as clean and efficient new energy transportation, their market share is still low, and it is difficult to be widely accepted.

BRIEF SUMMARY

In order to solve the above technical problems, the invention provides a DC power supply system, which comprises a fixed battery pack unit and a variable battery pack unit, the variable battery pack unit includes: a plurality of battery modules, which are respectively formed by combination and packaging of a plurality of monomer cells, with a battery module electrode and a battery module data exchange interface outside; a base, which is provided with a plurality of battery mounting positions, for accepting the plurality of battery modules in a way that can be quickly mounted and dismounted, and each of the battery mounting positions is provided with a base electrode terminal electrically connected with the battery module electrode of the battery module, and a base data exchange interface connected with the battery module data exchange interface; a power supply mode switching module, which is equipped with a selector switch and a switch controller, the selector switch is set corresponding to the battery mounting position, and the use and idle of the battery module mounted on the battery mounting position is selected based on the control of the switch controller; an external data exchange module, which is connected with the electronic control unit of the moving equipment driven by the DC power supply system and carries out data exchange; and a battery control module, which is connected with the external data exchange module and the switch controller, and dynamically selects one or more of the battery modules to put them in an operating state based on the information input from the external data exchange module.

In the DC power supply system of the invention, the battery control module controls the power supply mode switching module to make the DC power supply system operate in a plurality of power supply modes, which include the mode of using only a few (less than half) of the battery modules in the variable battery pack unit, the mode of using most (more than half) of the battery modules in the variable battery pack unit, the mode of using the fixed battery pack unit and combination thereof.

In the DC power supply system of the invention, the external data exchange module receives the power supply demand data transmitted by the electronic control unit. The power supply demand data includes the current road condition data of the moving equipment, the current driving behavior data of the driver, the vehicle speed data, the vehicle acceleration data, the brake pedal status data and the accelerator pedal status data.

In the DC power supply system of the invention, the power supply demand data also includes the data after processing the historical road condition data, the driver's historical driving habits data and the current road condition data based on the artificial intelligence algorithm.

The DC power supply system of the invention also includes a data storage module. The battery control module records the on-duty status and use history of each battery module in the plurality of battery modules, so as to obtain the on-duty status data and use history data of each battery module in the plurality of battery modules, store in the data storage module, and via the call of the electronic control unit of the moving equipment, display the on-duty status and use history of each battery module on the display screen.

In the DC power supply system of the invention, the user selects to use a combination of certain battery modules based on personal driving preferences according to the displayed on-duty status and use history of certain battery modules, and stores the selected combination in the data storage module as a custom mode.

In the DC power supply system of the invention, the user selects to use a combination of certain battery modules based on the road condition according to the displayed on-duty status and use history of certain battery modules, and stores the selected combination in the data storage module as a user-defined mode.

In the DC power supply system of the invention, the battery control module selects to use a combination of certain battery modules according to the road condition and based on the on-duty status and use history of certain battery modules, and stores it in the data storage module as a system-defined mode.

In the DC power supply system of the invention, the battery control module selects to use a combination of certain battery modules, recommends them to the user for selection, and prompts the user to save them according to the on-duty status and use history of some battery modules in combination with the driver's habits on the basis of the algorithm of artificial intelligence.

In the DC power supply system of the invention, the battery control module automatically switches the battery power supply mode according to the input road condition data, and selects the power supply mode using only a few of the battery modules when the sensor of the moving equipment driven thereby detects the road congestion ahead, and automatically switches to the power supply mode that combines part of the battery module with the fixed battery pack unit when the sensor of the driven moving equipment detects that the road ahead is clear.

In the DC power supply system of the invention, the battery control module automatically switches the battery power supply mode according to the accelerator pedal status data input by the external data exchange module, and immediately switches to the power supply mode that combines part of the battery module with the fixed battery pack unit after judging that the accelerator pedal is pressed for a fixed time.

In the DC power supply system of the invention, the battery control module automatically switches the battery power supply mode according to the vehicle speed data input by the external data exchange module, and switches to the power supply mode using only a few of the battery modules when determining that the vehicle speed reaches the predetermined speed.

In the DC power supply system of the invention, the battery power supply mode is automatically switched according to the road condition, and when the sensor of the driven moving equipment detects the road condition that allows the driver to overtake or merge, it is switched to the power supply mode that combines part of the battery module with the fixed battery pack unit.

In the DC power supply system of the invention, the battery control module uses machine learning and deep learning to form a combination mode that conforms to the user's driving preferences based on the previous road data and the user's driving habits data, and automatically applies to the current battery control.

In the DC power supply system of the invention, the battery control module, based on the model of machine learning and deep learning, and based on the previous road data and the user's driving habits data, forms a combination mode that conforms to the user's driving preferences, and displays and recommends to the user for selection.

In the DC power supply system of the invention, a circuit connection diagram of the power supply system is displayed on the display screen, and the on-duty or idle status of each battery module is displayed with specific colors or graphics.

In the DC power supply system of the invention, the moving equipment is a vehicle, an aircraft, or a ship.

The invention also discloses a battery module charging system, which charges the battery module of the DC power supply system of the invention, including a DC power supply, a battery mounting position, a control system, a data exchange system and a display system, and collects fees based on the charging degrees of the battery module and the time occupied by battery charging.

In the battery module charging system of the invention, the battery module composed of a plurality of element battery cells is connected with the electrode set on the battery mounting position through its own attached electrode.

In the battery module charging system of the invention, the battery module inserted in the battery mounting position is identified, and the brand, service history, remaining power, remaining life and corresponding recommended price of the battery module are displayed.

In the battery module charging system of the invention, there is also a payment system through which users can charge or trade the batteries.

According to the DC power supply system of the invention, the fixed battery pack unit and the variable battery pack unit are used together, and the use and idle of some battery modules in the variable battery pack unit are selected according to the actual scenario, so as to reduce the on-duty time of the fixed battery pack unit and increase the use time of some battery modules in the variable battery pack unit. In addition, the depleted battery modules in the variable battery pack unit shall be replaced partially or completely in time. Therefore, not only the total driving range of the vehicle is increased, and the driving anxiety eliminated, such problems as the shortage of large charging stations, long waiting time for charging, inconvenient charging and the like are overcome as well. At the same time, it also takes into account the driving experience and has more powerful drive, thus improving the control and safety of the vehicle.

The battery module charging system according to the invention can conveniently charge the battery module by configuring it in the apartment or office area, and can realize real-time sale and purchase of batteries, thus making it convenient for the vehicle owner to choose the vehicle's driving range in a variety of ways.

BRIEF DESCRIPTION OF THE DRAWINGS

In the figures: 10—DC power supply system, 11—fixed battery pack unit, 12—variable battery pack unit, 121~12N—battery mounting positions, 131~13N—battery modules (abbreviated as B.M. in FIG. 2-FIG. 10), 14—data storage module, 15—external data exchange module, 16—battery control module, 17—battery data exchange module, 18—charging control module, 19—charging coupling module, 21—electric equipment, 22—electronic control unit (ECU), 31—external charging equipment, 51—power supply switching module, 80—AI machine learning module, 511~51N, 521, 522, 523—selector switches, M1, M2—motors.

DETAILED DESCRIPTION OF THE INVENTION

In this invention, "a few" means less than half, "most" means more than half, while "low power", "medium power", "high power" and "full power" generally refer to the relative high and low output voltage of the DC power supply system, each of which has a range. Embodiments of the invention are described below in conjunction with the accompanying drawings.

Figure 1:
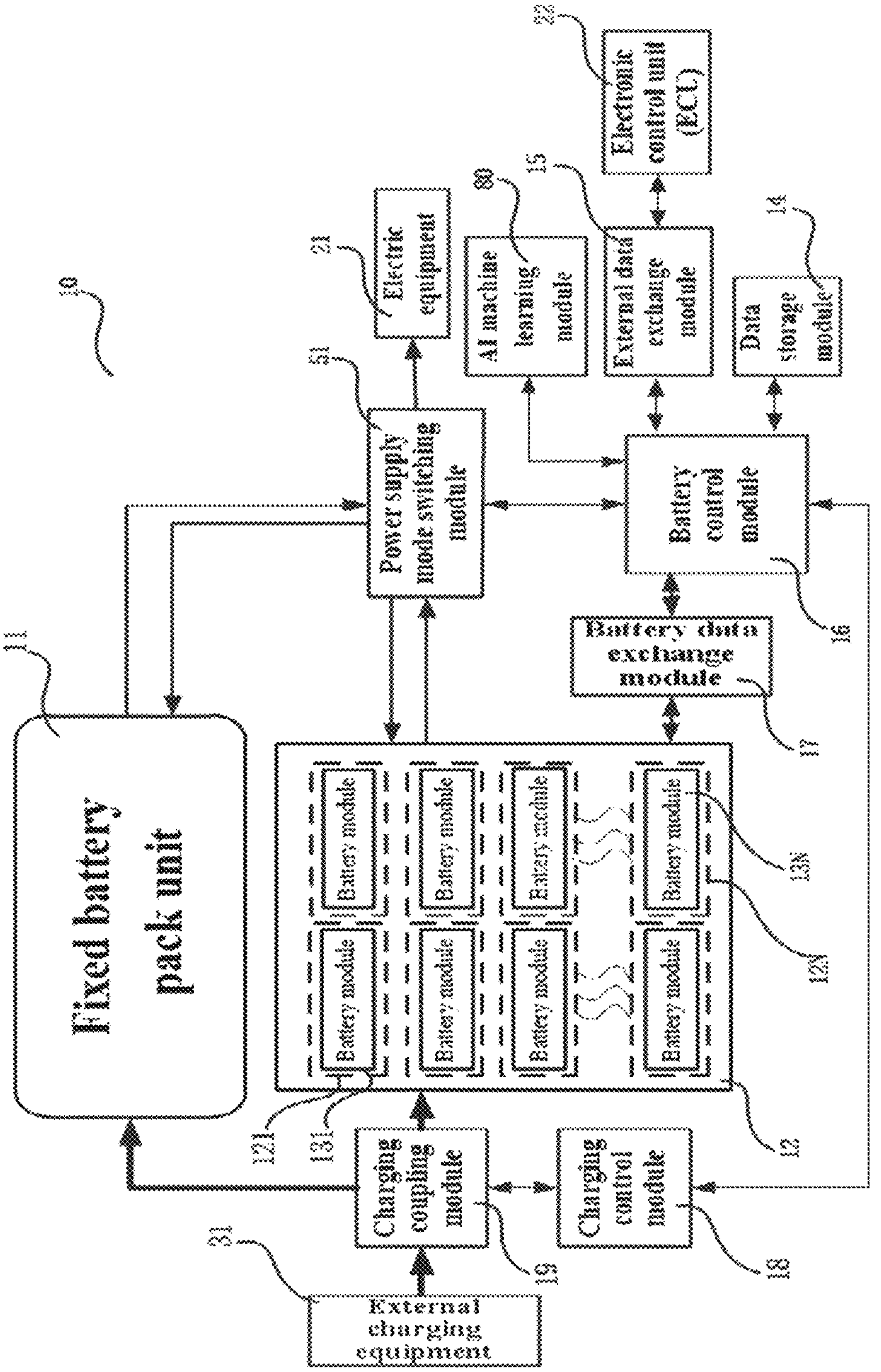
FIG. 1 is a functional structure block diagram of the DC power supply system of the invention.

FIG. 1 is a functional structure block diagram of the DC power supply system of the invention. As shown in FIG. 1, the DC power supply system 10 of the invention includes a fixed battery pack unit 11 and a variable battery pack unit 12. The fixed battery pack unit 11 is formed by combination and packaging of a plurality of monomer cells (also referred to as battery cells), with fixed capacity and output voltage. The capacity of the fixed battery pack unit 11 may be 60 kwh, and the output voltage may be 300V, for example.

The variable battery pack unit 11 includes: a plurality of battery modules 131~13N, which are respectively formed by combination and packaging of a plurality of monomer cells, with external battery module electrodes and battery module data exchange interfaces; a base 12, which is provided with a plurality of battery mounting positions 121~12N, for mounting the plurality of battery modules 131~13N respectively, and on each of the battery mounting positions 121 are a base electrode terminal electrically connected with the battery module electrode of the battery module and a base data exchange interface connected with the battery module data exchange interface; a power supply mode switching module 51, which is configured on the base 12, with selector switches 511~51N and corresponding switch controllers (not shown), the selector switches 511~51N are respectively set corresponding to each of the battery mounting positions 121, selecting the use and idle of the battery modules 13I mounted on the battery mounting positions 121 based on the control of the switch controllers; an external data exchange module 15, which is connected with the electronic control unit (ECU) of the moving equipment driven by the DC power supply system 10 and carries out data exchange; and a battery control module 16, which is connected with the external data exchange module 15 and the switch controller, and dynamically selects one or more of the battery modules 131~13L to put them in an operating state based on the information input from the external data exchange module 15.

The plurality of battery modules 131~13N are respectively mounted in the plurality of battery mounting positions 121~12N in a way that can be quickly mounted and dismounted. The snap structure, bolt quick locking structure and other quick mounting and dismounting structures of the prior art can be adopted.

The selector switches 511~51N can use Power Metal-Oxide-Semiconductor Field-Effect Transistor (Power MOSFET), Insulated Gate Bipolar Transistor (IGBT), solid-state relay, Silicon Controlled Rectifier (SCR), Gate-Turn-Off Thyristor (GTO) and other circuit switching devices that can control the high voltage on/off through a low voltage signal.

The battery control module 16 can adopt microprocessor systems such as Central Processing Unit (CPU), Digital Signal Processor (DSP), Graphics Processing Unit (GPU), Field Programmable Gate Array (FPGA), etc.

External data can be obtained by the Electronic Control Unit (ECU) of the moving equipment through the long-range radar, laser radar, short-range radar, on-board camera, ultrasonic, positioning system, gyroscope, etc. carried by the moving equipment, and transmitted to the external data exchange module 15.

In addition, a voltage conversion circuit, such as a boost circuit, can be set in the charging coupling module 19. After the voltage of the variable battery pack unit 12 is boosted and converted, the fixed battery pack unit 11 is charged by the variable battery pack unit 12. Through the control of the charging control module 18, and according to the actual situations, the fixed battery pack unit 11 can be charged with continuous constant current or continuous constant voltage, or with pulse current, or with variable current intermittently, or with variable voltage intermittently. Therefore, the cycle life of the fixed battery pack unit 11 can be maximized.

TABLE 1

| Power Supply Modes | Battery Pack Usage Schemes | Output Voltage Ranges |
| --- | --- | --- |
| Low power mode L | Only use less than half (e.g., 2-10) of the battery modules in the variable battery pack unit, do not use the fixed battery pack unit. | 24 V~120 V |
| Medium power mode M | Use more than half (e.g., 16 or all 20) of the battery modules in the variable battery pack unit, do not use the fixed battery pack unit. | 192 V~240 V |
| High power mode H | Use less than half (e.g., 2-10) of the battery modules in the variable battery pack unit, and use the fixed battery pack unit (connected in series with the variable battery pack unit) at the same time. | 324 V~420 V |
| Full power mode F | Use all the battery modules in the variable battery pack unit and use the fixed battery pack unit at the same time. | 540 V |

The weight of each battery module 13I can be designed according to actual needs, for example, it can be about 10 kg. The charging and discharging voltage can be designed to be 12V, the charging capacity is about 3-5 kwh, and the corresponding range is 20 km-30 km.

In the DC power supply system 10 of the invention, as shown in Table 1, the battery control module 16 can control the DC power supply system 10 to switch between the low power mode and the high power mode. The low power mode here is the mode that only a few (less than half) battery modules 13I in the variable battery pack unit 12 are used, while the high power mode here is to use a few (less than half) battery modules 13I in the variable battery pack unit 12 and use the fixed battery pack unit 11 at the same time.

Further, as shown in Table 1, the power supply mode can also be subdivided to include a medium power mode M and a full power mode F. The battery control module 16 controls the DC power supply system to switch between the low power mode L, the medium power mode M, the high power mode H and the full power mode F. Similarly, the low power mode L is the mode that only a few (less than half) battery modules 13I in the variable battery pack unit 12, and the high power mode is the mode that a few (less than half) of the battery modules in the variable battery pack unit are used and the fixed battery pack unit is used at the same time (series connection). In addition, the medium power mode M is the mode of using only most (more than half) or even all battery modules in the variable battery pack unit, while the full power mode F is the mode of using all the battery modules 131~13N in the variable battery pack unit 12 and using the fixed battery pack unit at the same time (series connection).

Figure 2:
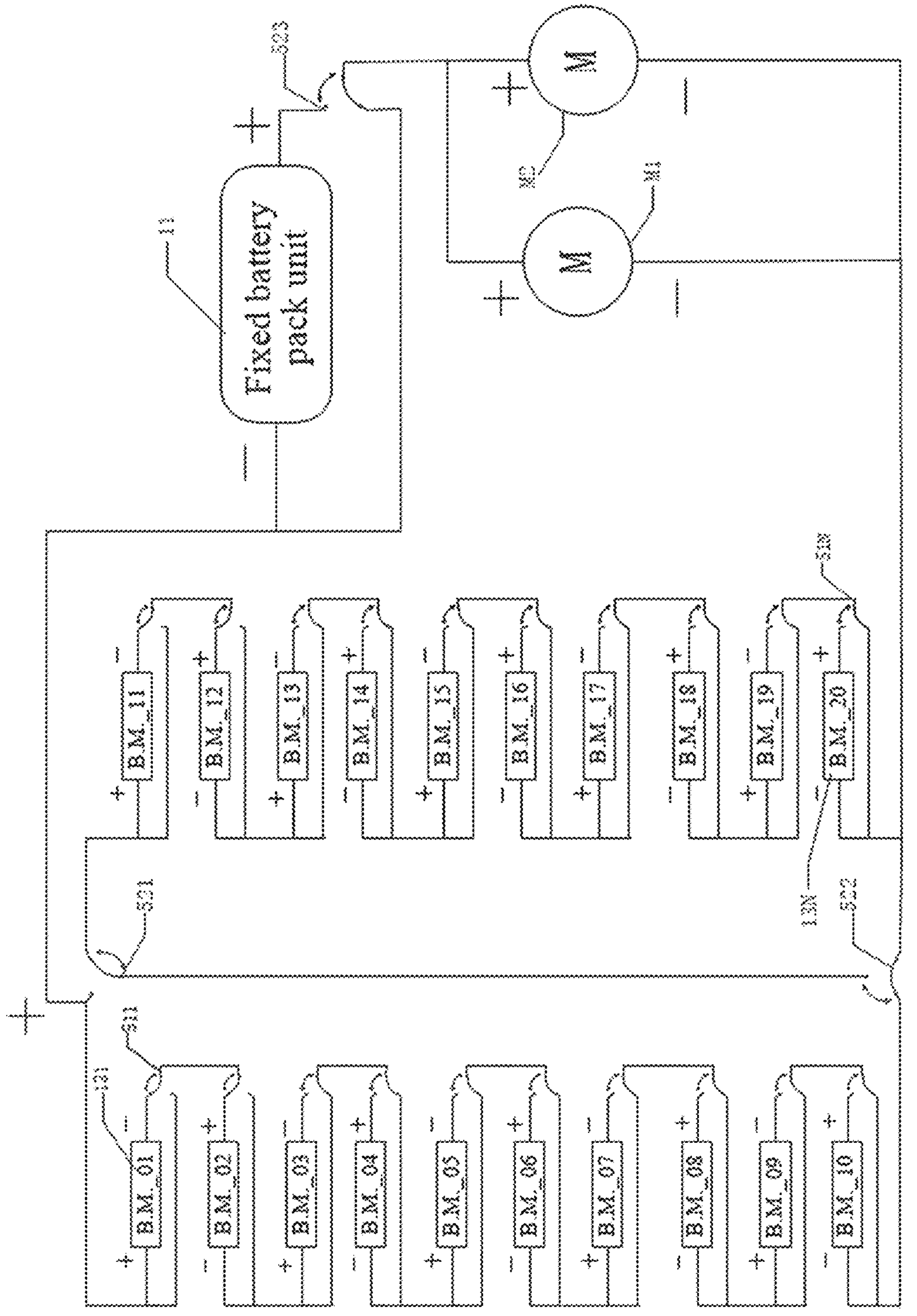
FIG. 2 is a circuit connection diagram of the first embodiment of the DC power supply system of the invention in a low power mode.
Figure 3:
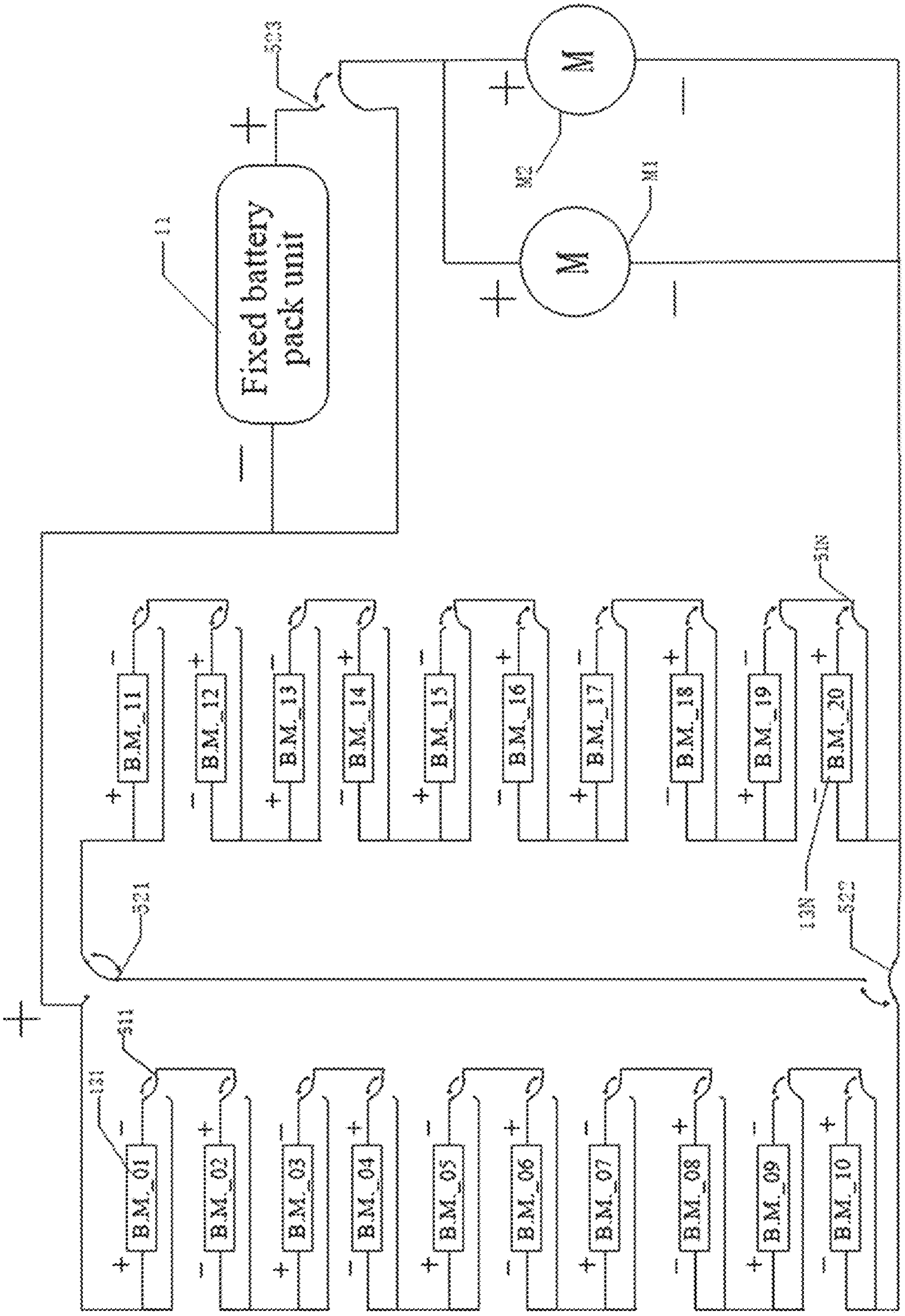
FIG. 3 is a circuit connection diagram of the second embodiment of the DC power supply system in a low power mode.

FIG. 2 is a circuit connection diagram of the first embodiment of the DC power supply system of the invention in a low power mode. As shown in FIG. 2, in the low power mode of this embodiment, only two battery modules are in operation and the output voltage is 24V. FIG. 3 is a circuit connection diagram of the second embodiment of the DC power supply system in a low power mode. As shown in FIG. 3, in the low power mode of the embodiment, eight battery modules are in operation and the output voltage is 96V.

Figure 4:
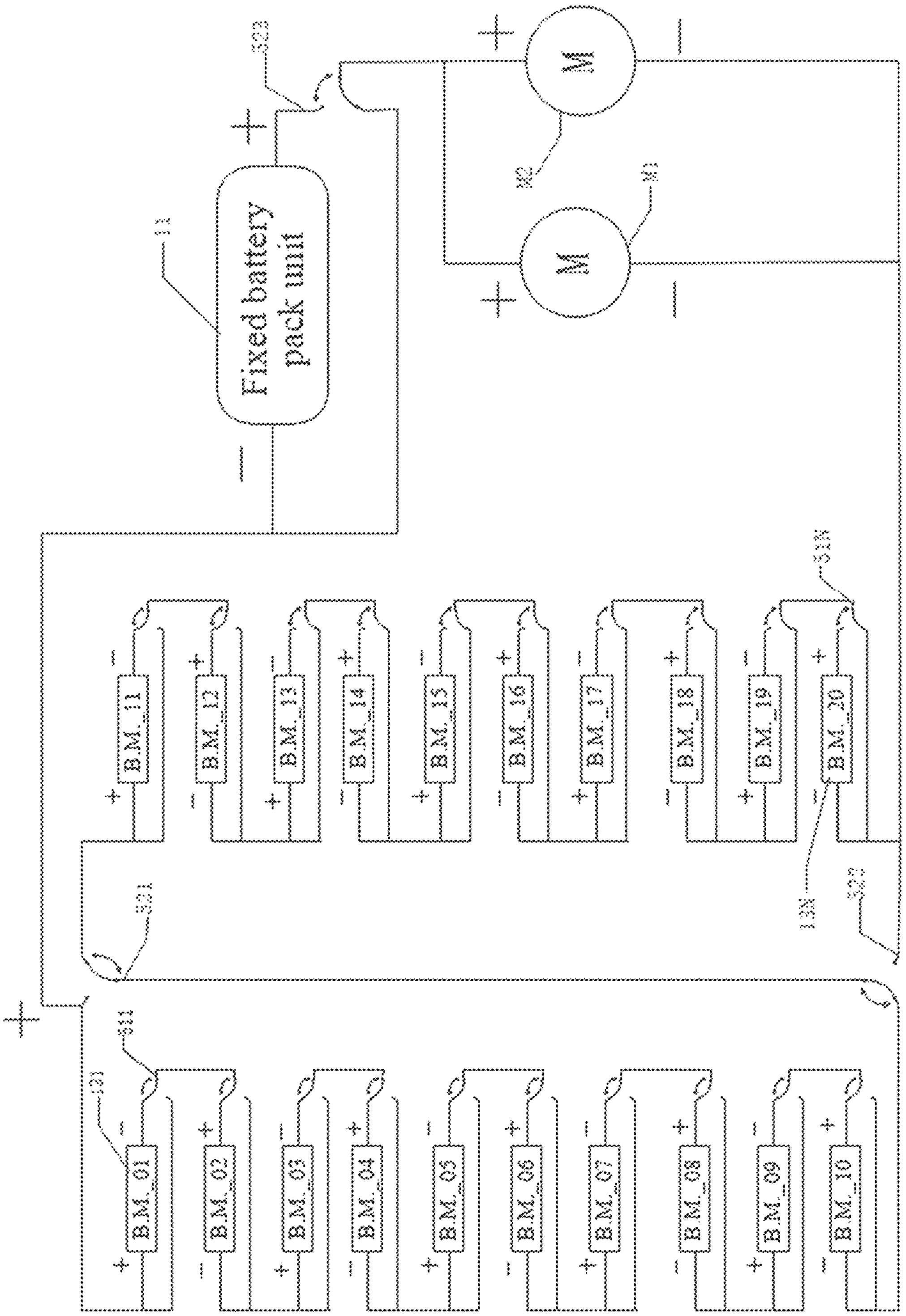
FIG. 4 is a circuit connection diagram of the first embodiment of the DC power supply system of the invention in a medium power mode.
Figure 5:
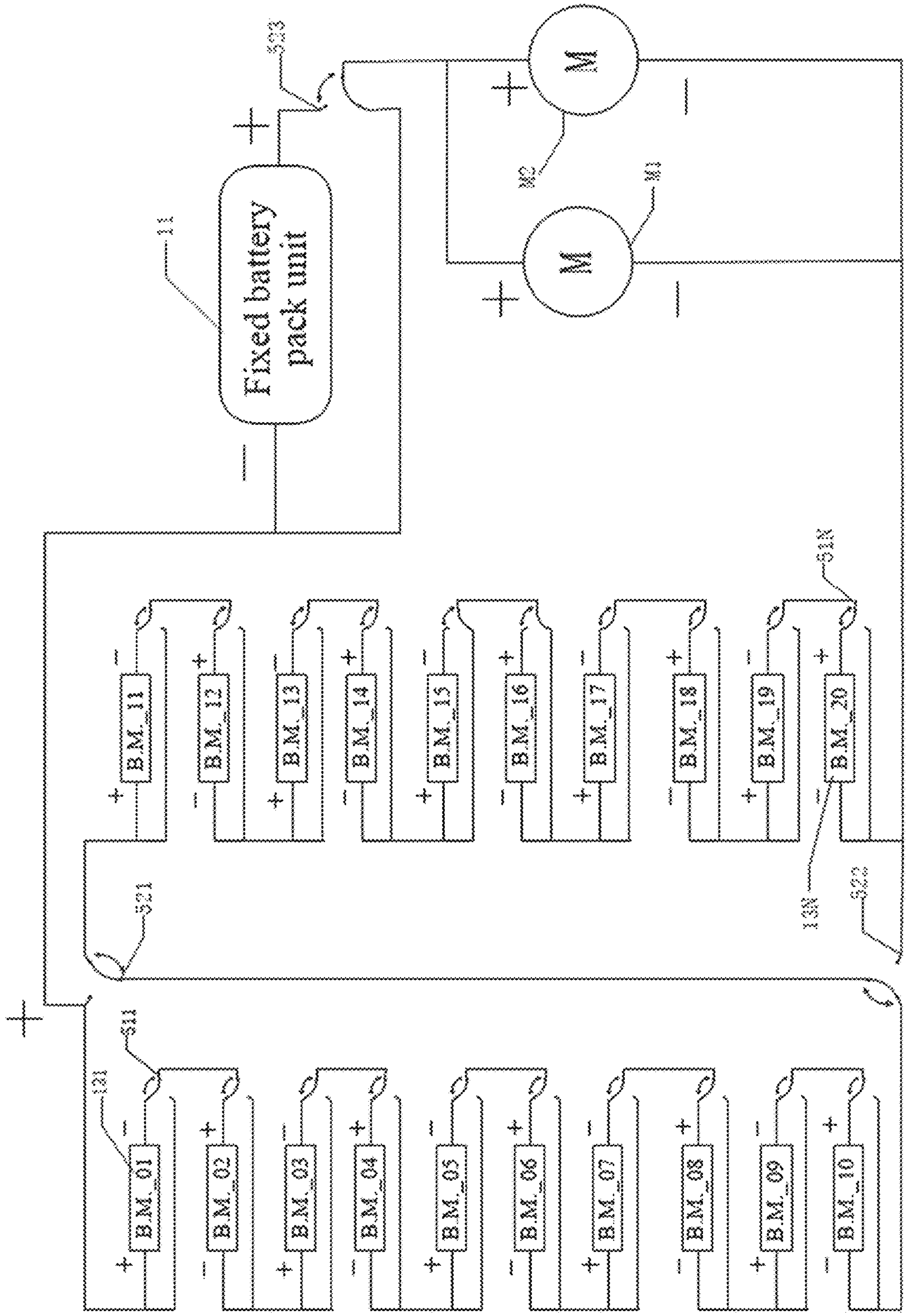
FIG. 5 is a circuit connection diagram of the second embodiment of the DC power supply system in a medium power mode.

FIG. 4 is a circuit connection diagram of the first embodiment of the DC power supply system of the invention in a medium power mode. As shown in FIG. 4, in the medium power mode of this embodiment, twelve battery modules are in operation and the output voltage is 144V. FIG. 5 is a circuit connection diagram of the second embodiment of the DC power supply system in a medium power mode. As shown in FIG. 5, in the medium power mode of this embodiment, eighteen battery modules are in operation, and the output voltage is 216V.

Figure 6:
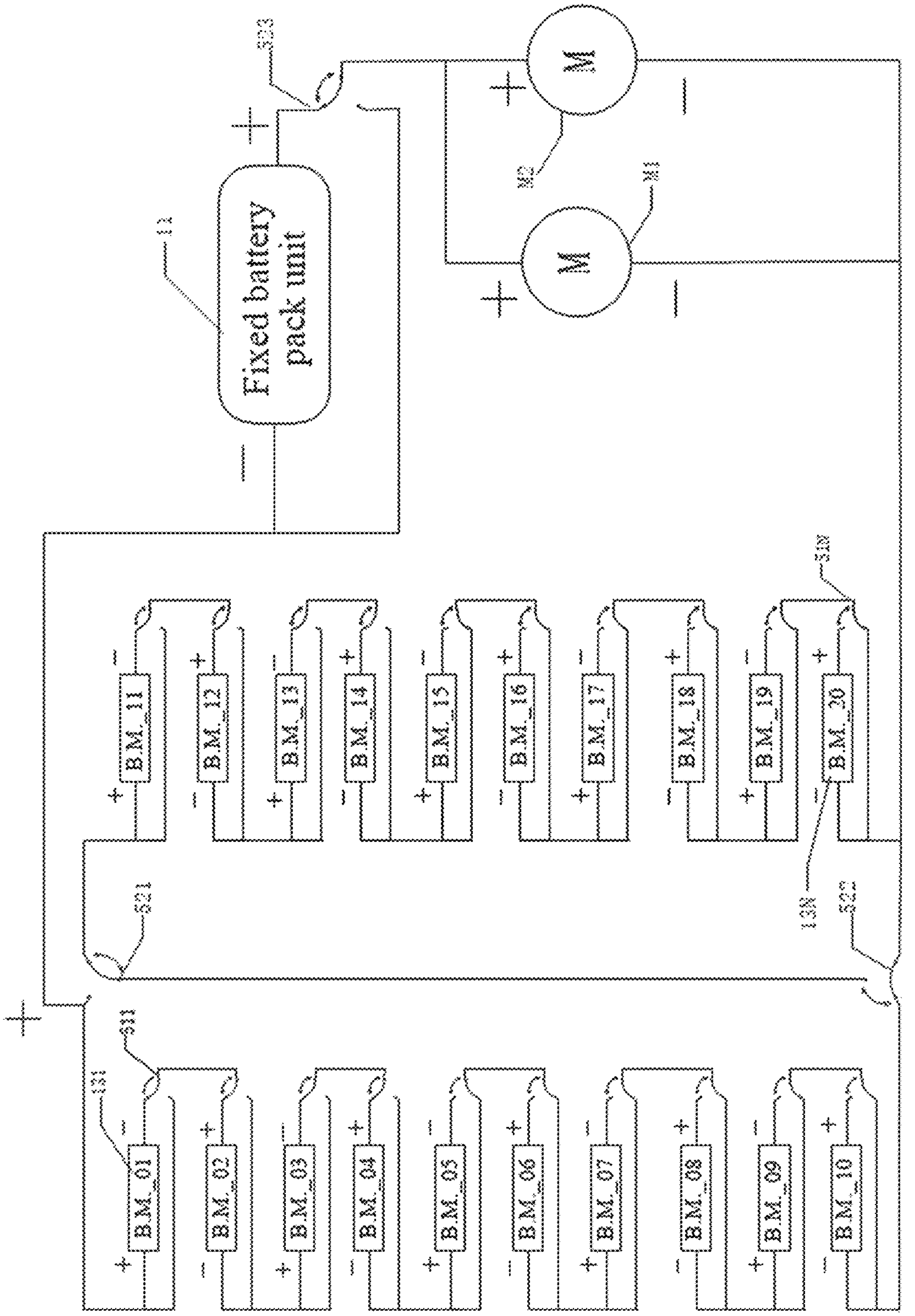
FIG. 6 is a circuit connection diagram of the first embodiment of the DC power supply system of the invention in a high power mode.
Figure 7:
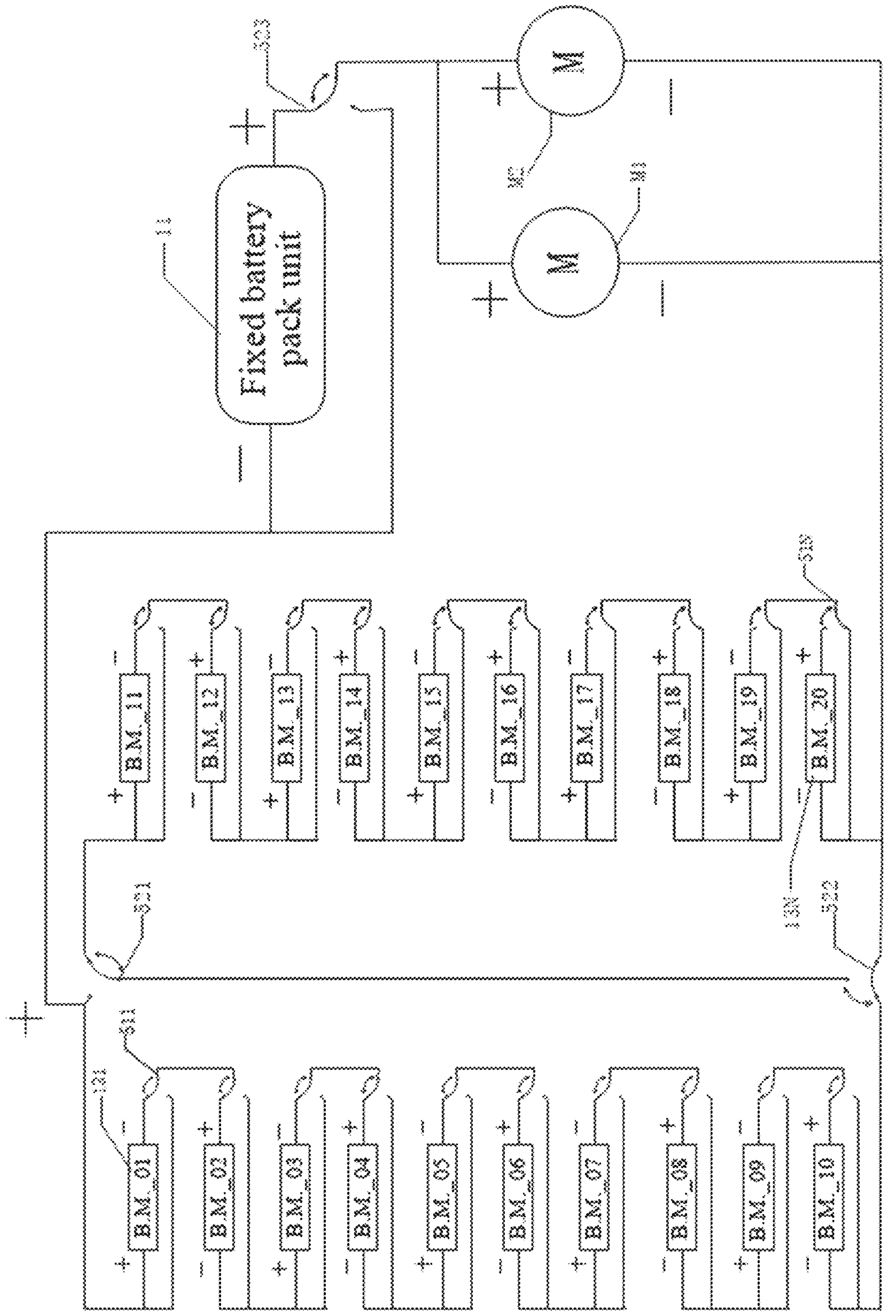
FIG. 7 is a circuit connection diagram of the second embodiment of the DC power supply system of the invention in a high power mode.

FIG. 6 is a circuit connection diagram of the first embodiment of the DC power supply system of the invention in a high power mode. As shown in FIG. 6, in the high power mode of this embodiment, there are four battery modules in operation, the fixed battery unit 11 is also in power supply state by shifting the selector switch 521~523, and the total output voltage is 348V (300V+48V). FIG. 7 is a circuit connection diagram of the second embodiment of the DC power supply system of the invention in a high power mode. As shown in FIG. 7, in the high power mode of this embodiment, there are ten battery modules in operation, the fixed battery unit 11 is also in the power supply state by shifting the selector switch 521~523, and the total output voltage is 420V (300V+120V).

Figure 8:
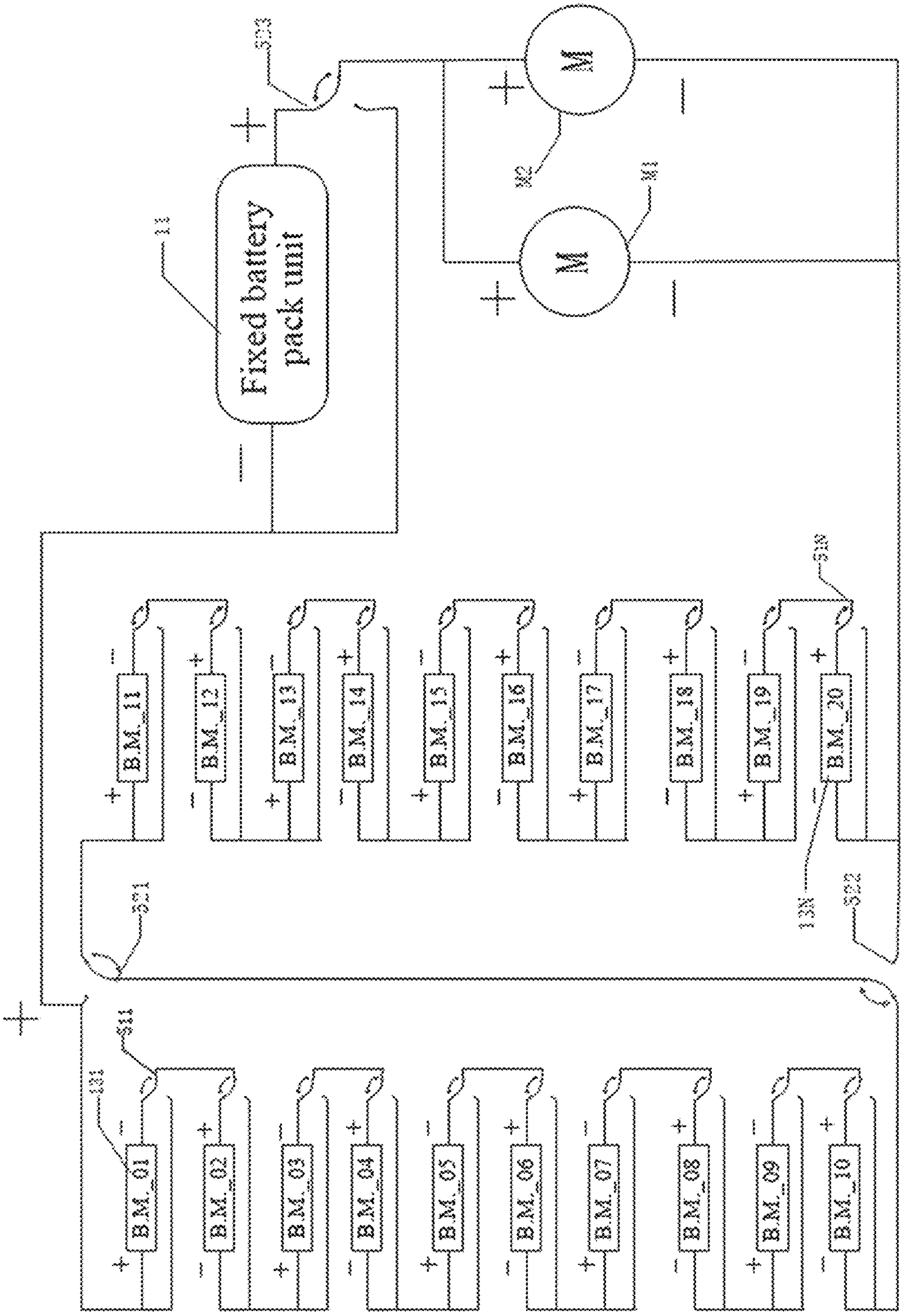
FIG. 8 is a circuit connection diagram of the DC power supply system of the present invention in a full power mode.

FIG. 8 is a circuit connection diagram of the DC power supply system of the present invention in a full power mode. As shown in FIG. 8, all twenty battery modules are in operation in the full power mode, and the output voltage is 540V.

In the DC power supply system 10 of the invention, the external data exchange module 15 receives the power supply demand data transmitted by the electronic control unit 22 of such moving equipment as vehicle, ship, aircraft or flying car, and etc. The power supply demand data can also be the data obtained by the external data exchange module 15 from the Internet of Vehicles. The power supply demand data includes the moving equipment's current road condition data, the driver's current driving behavior data, vehicle speed data, vehicle acceleration data, brake pedal status data and accelerator pedal status data.

In addition, the power supply demand data may also include the data after processing the historical road condition data, the driver's historical driving habits data and the current road condition data based on the artificial intelligence algorithm.

The DC power supply system 10 of the invention preferably also includes a data storage module 14. The battery control module 16 records the on-duty status and use history of each battery module 13I in a plurality of battery modules 131~13N, so as to obtain the on-duty status data and use history data of each battery module 13I in a plurality of battery modules 131~13N, store in the data storage module 14, and via the call of the electronic control unit 22 of the moving equipment, display the on-duty status and use history of each battery module 13I on the central display screen of the moving equipment.

In the DC power supply system 10 of the invention, the battery control module 16 can also automatically switch the battery power supply mode according to the input road condition data, and select the power supply mode using only a few of the battery modules 13I when the on-board sensor detects the road congestion ahead, and automatically switch to the power supply mode that combines part of the battery module 13I with the fixed battery pack unit when the on-board sensor detects that the road ahead is clear.

In the DC power supply system 10 of the invention, the battery control module 16 may also automatically switch the battery power supply mode according to the input road condition data, and immediately switch to the power supply mode that combines part of the battery module 13I with the fixed battery pack unit after judging that the accelerator pedal is pressed for a fixed time.

In the DC power supply system 10 of the invention, the battery control module may automatically switch the battery power supply mode according to the input channel status data, and switch to the power supply mode using only a few of the battery modules after judging that the vehicle speed reaches the predetermined speed according to the input data.

In the DC power supply system 10 of the invention, the battery power supply mode may also be automatically switched according to the road condition, and when the on-board sensor detects the road condition that allow the driver to overtake or merge, it is switched to the power supply mode that combines part of the battery module with the fixed battery pack unit. The on-board sensor may be ultrasonic radar, laser radar, millimeter wave radar, on-board camera, and infrared probe.

As an example, Table 2 shows the power supply mode switching schemes and actual scenarios under several common driving modes. The schemes can be built in the system, set at the factory, and implemented by the software and hardware of the prior art.

TABLE 2

| Driving Modes | Power Supply Mode Switching Schemes | Actual Scenarios |
|---|---|---|
| Cold start | High power mode | The battery control module automatically switches to the high power mode when it detects that the vehicle is cold start after complete power off. |
| Start driving | High power mode → low power mode | After the whole vehicle is powered on, it automatically switches to the low power mode and waits to start driving. |
| First acceleration | Low power mode → high power mode | After the vehicle starts driving, the battery control module, when judging that the road condition ahead allows driving at a higher speed based on the data of the road condition ahead detected by the on-board sensor, automatically switches to the high power mode; if it is judged that the road ahead is congested and it is not allowed to drive at a higher speed, the low power mode is maintained. |
| First constant speed driving | High power mode → low power mode | Based on the current vehicle speed data and the data of the road condition ahead detected by the on-board sensor, the battery control module, when judging that the current vehicle speed is basically equal to the allowable speed of the road condition and the speed limit of the road section, automatically switches to the low power mode to keep the vehicle driving at a constant speed at the current vehicle speed. |
| Secondary acceleration | Low power mode → high power mode | Based on the current vehicle speed data and the data of the road condition ahead detected by the on-board sensor, the battery control module, when judging that the current vehicle speed is lower than the allowable speed of the road condition, automatically switches to the high power mode in preparation for the user to speed up. |
| Second constant speed driving | High power mode → low power mode | Based on the current vehicle speed data and the data of the road condition ahead detected by the on-board sensor, the battery control module, when judging that the current vehicle speed is basically equal to the allowable speed of the road condition, switches to the low power mode to keep the vehicle driving at a constant speed at the current vehicle speed. |
| Overtaking and merging | Low power mode → high power mode | Based on the data of the road condition ahead of the adjacent lane detected by the on-board sensor, the battery control module, when judging that the road condition of the adjacent lane allows driving at a higher speed, switches to the high power mode in preparation for the user to overtake and merge. |
| Active acceleration | Low power mode → high power mode | Based on the accelerator pedal data, the battery control module, when judging that the accelerator pedal is pressed for a specific time, switches to the high power mode in preparation for the user to accelerate. |
| Passive deceleration | High power mode → low power mode | 1. Based on the current vehicle speed data and the data of the road condition ahead detected by the on-board sensor, the battery control module, when judging that the current vehicle speed is higher than the allowable speed of the road condition, switches to the low power mode to coordinate with the vehicle deceleration; 2. Based on the current vehicle speed data and the data of the road condition ahead detected by the on-board sensor, the battery control module, when judging that there is a static obstacle ahead, switches to the low power mode to coordinate with the vehicle deceleration. |
| Active deceleration | High power mode → low power mode | Based on the brake pedal data, the battery control module, when judging that the brake pedal is pressed for a specific time, switches to the low power mode in preparation for the user to slow down or stop. |

TABLE 2-continued

| Driving Modes | Power Supply Mode Switching Schemes | Actual Scenarios |
|---|---|---|
| Waiting | High power mode low power mode | 1. Wait for the red light to turn green; 2. The road is seriously congested, drive slowly, or stop-and-go; 3. Temporary parking. |

As shown in Table 2, during cold start, the battery control module 16 automatically switches to the high power mode H when it detects that the vehicle is cold start after complete power off.

In the start driving stage, after the whole vehicle is powered on, it automatically switches to the low power mode L and waits to start driving.

In the first acceleration stage, after the vehicle starts driving, the battery control module 16, when judging that the road condition ahead allows driving at a higher speed based on the data of the road condition ahead detected by the on-board sensor, automatically switches to the high power mode H; if it is judged that the road ahead is congested and it is not allowed to drive at a higher speed, the low power mode is maintained.

In the first constant speed driving stage, based on the current vehicle speed data and the data of the road condition ahead detected by the on-board sensor, the battery control module 16, when judging that the current vehicle speed is basically equal to the allowable speed of the road condition, automatically switches to the low power mode L to keep the vehicle driving at a constant speed at the current vehicle speed.

In the secondary acceleration stage, based on the current vehicle speed data and the data of the road condition ahead detected by the on-board sensor, the battery control module 16, when judging that the current vehicle speed is lower than the allowable speed of the road condition, automatically switches to the high power mode H, in preparation for the user to speed up.

In the second constant speed driving stage, based on the current vehicle speed data and the data of the road condition ahead detected by the on-board sensor, the battery control module 16, when judging that the current vehicle speed is basically equal to the allowable speed of the road condition, switches to the low power mode L to keep the vehicle driving at a constant speed at the current vehicle speed.

In the overtaking and merging phase, based on the data of the road condition ahead of the adjacent lane detected by the on-board sensor, the battery control module 16, when judging that the road condition of the adjacent lane allows driving at a higher speed, switches to the high power mode H in preparation for the user to overtake and merge.

In the active acceleration phase, based on the accelerator pedal data, the battery control module 16, when judging that the accelerator pedal is pressed for a specific time, switches to the high power mode H in preparation for the user to accelerate of his own accord.

In the passive deceleration phase, based on the current vehicle speed data and the data of the road condition ahead detected by the on-board sensor, the battery control module 16, when judging that the current vehicle speed is higher than the allowable speed of the road condition, switches to the low power mode L to coordinate with the vehicle deceleration; in addition, the battery control module 16 may also be based on the current vehicle speed data and the data of the road condition ahead detected by the on-board sensor, when judging that there is a static obstacle ahead, switches to the low power mode L to coordinate with the vehicle deceleration.

In the active deceleration phase, based on the brake pedal data, the battery control module 16, when judging that the brake pedal is pressed for a specific time, switches to the low power mode L in preparation for the user to slow down or stop.

In the waiting phase, when the waiting for the red light to turn green, the road is seriously congested, the driving is slow, or stop-and-go, switch to the low power mode L. In addition, in the case of temporary parking, it is also switched to the low power mode L.

In the DC power supply system 10 of the invention, the system implements the above driving modes by software and hardware, and the system automatically calls the above driving modes in actual scenarios.

In the DC power supply system 10 of the invention, the battery control module 16 may be based on machine learning and deep learning to form a combination mode that conforms to the user's driving preferences on the basis of the previous road data and the user's driving habits data, and automatically apply to the current battery control.

In the DC power supply system 10 of the invention, the battery control module may also be based on the model of machine learning and deep learning, and on the basis of the previous road data and the user's driving habits data, to form a combination mode that conforms to the user's driving preferences, and display and recommend to the user for selection.

In the DC power supply system 10 of the invention, users can also choose to use a combination of certain battery modules 13I~13J based on the personal driving preferences according to the displayed on-duty status and use history of certain battery modules 13I~13L, and store the selected combination in the data storage module 14 as a self-defining mode.

In the DC power supply system 10 of the invention, users can also choose to use a combination of certain battery modules 13I~13L based on the road condition according to the displayed on-duty status and use history of certain battery modules 13I~13L, and store the selected combination in the data storage module 14 as a user-defined mode.

In the DC power supply system 10 of the invention, the battery control module 16 may also choose to use a combination of certain battery modules 13I~13L based on the road condition and the on-duty status and use history of certain battery modules 13I~13L, and store it in the data storage module 14 as a system-defined mode.

TABLE 3

| Control Modes | Power Supply Mode Switching Schemes | Actual Scenarios |
|---|---|---|
| Smooth commuting | High power mode first, low power mode cooperates | The distance is about 20 km, the road condition is relatively smooth, and the allowable speed is about 40 Km/h |
| Congested commuting | Low power mode first, high power mode cooperates | The distance is about 10km, relatively congested, the allowable speed of the road condition is about 15 Km/h |

TABLE 3-continued

| Control Modes | Power Supply Mode Switching Schemes | Actual Scenarios |
|---|---|---|
| Suburban travel | Medium power mode first, high power mode cooperates | The distance is about 30 km, the road condition is relatively smooth, and the allowable speed is about 50 Km/h |
| Interprovincial travel | High power mode first, low power mode cooperates | The distance is about 800 km, on the highway, and the allowable speed is about 90 Km/h |
| Motor racing | Full time and full power mode | 1. With fast charging conditions; 2. On a professional racing track, experience the racing mode, and seek the driving pleasure of strong back pushing. |

As an example, as shown in Table 3, the five common driving modes that the system can provide are selected by the user according to actual scenarios. These five common driving modes include smooth commuting mode, congested commuting mode, suburban travel mode, interprovincial travel mode, and motor racing mode. Of course, the invention is not limited to this, but also can provide more driving modes through a combination of the fixed battery pack unit 11 and the variable battery pack unit 12 according to the change of actual scenarios. In addition, the user can also combine the battery switching schemes to form a customized driving mode. To be specific, the circuit connection diagram of the vehicle's power supply system is displayed on the dedicated display screen or the vehicle's central control screen. The user selects the battery symbol representing the battery module displayed on the operation screen (touch, click) to make the specific battery module on duty or idle, thus editing and designing the desired power supply mode. The selector switch in the invention adopts solid-state relay, IGBT and other circuit switches, having high response speed and voltage resistance but no mechanical noise, so users will not feel any inconvenience in the switching process. The process of the system automatically switching power supply mode can hardly be perceived as noise or interference.

Besides, in the DC power supply system 10 of the invention, the algorithm of the AI machine learning module 80 can also be designed, and the machine learning technology based on the AI algorithm can be used to provide the recommended driving mode. Alternatively, the algorithm itself can be trained using deep learning technology to further improve the humanization of the recommended model.

In the DC power supply system 10 of the invention, the battery control module 16 can also choose to use a combination of certain battery modules 13I~13L according to the on-duty status and use history of certain battery modules 13I~13L, combined with the driver's habits and based on the algorithm of artificial intelligence, and display it on the display screen as the recommended mode for the user to select and prompt the user to save.

In the DC power supply system 10 of the invention, the battery data exchange module 17 further has a battery internal resistance detection device, which detects the internal resistance of each battery, and for the battery module 13I whose internal resistance exceeds a certain threshold, reminds the user to switch off manually or automatically by the system.

In the DC power supply system 10 of the invention, the battery data exchange module 17 further has a current detection device, which monitors the current of each battery module 13I, and displays accordingly on the display device when the current is lower or higher than a specific threshold.

In the DC power supply system 10 of the invention, the battery data exchange module 17 further has a temperature detection device, which monitors the temperature of each battery module, displays accordingly on the display device when the temperature of a certain battery module is higher than a specific threshold, and reminds the user to switch off manually or automatically by the system.

Figure 9:
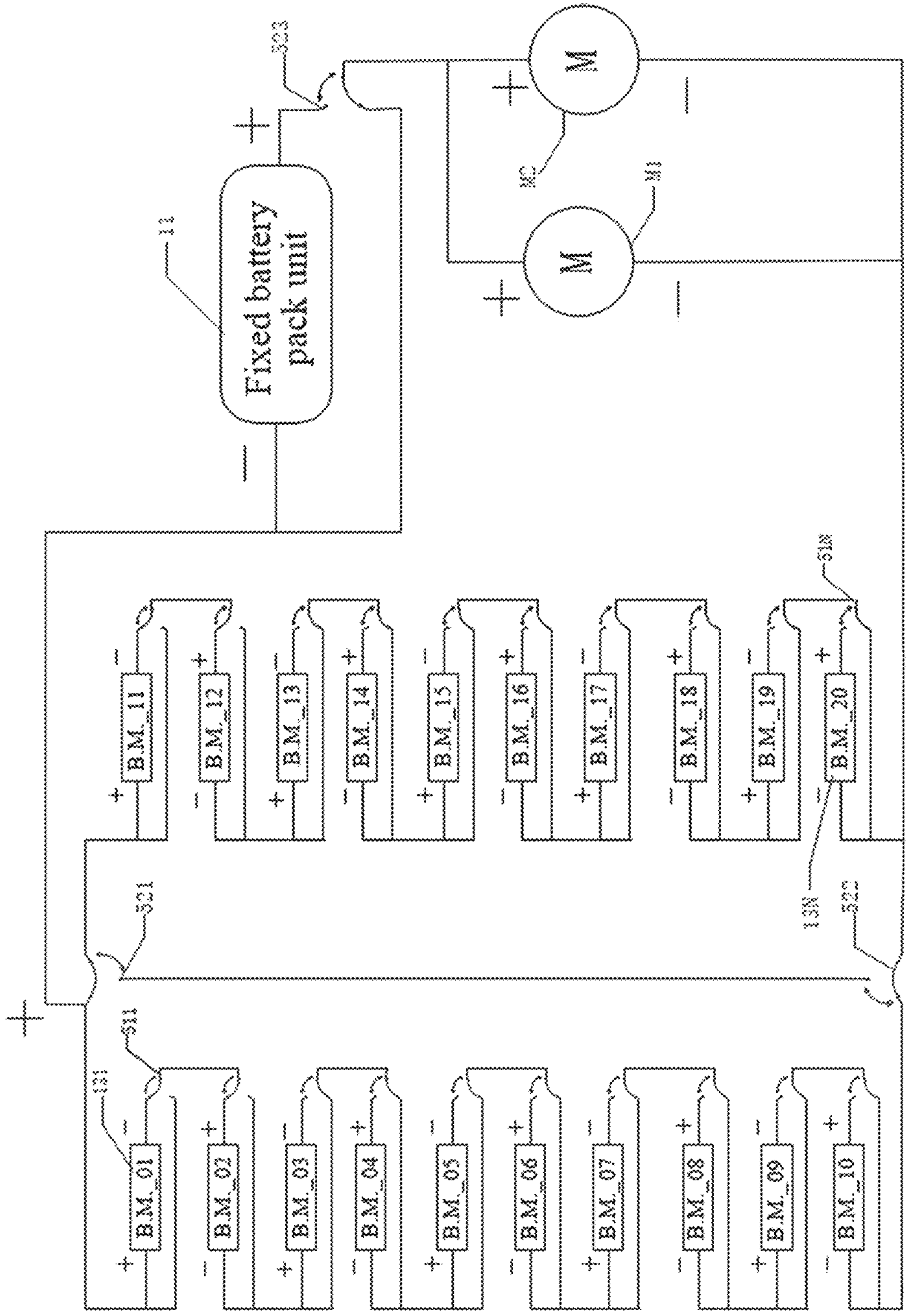
FIG. 9 is a circuit connection diagram of the shunt cooling state of the third embodiment of the DC power supply system in a low power mode.
Figure 10:
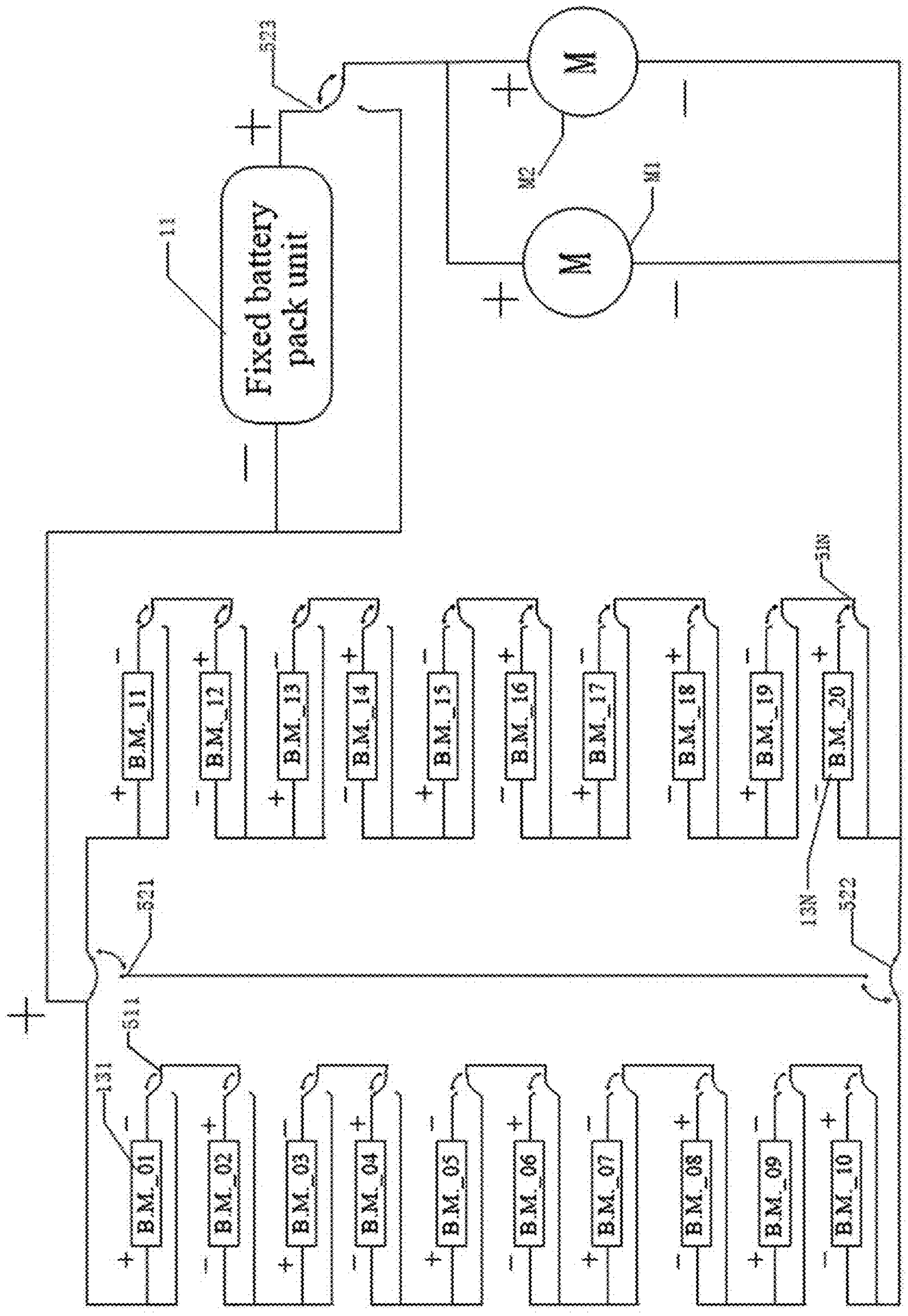
FIG. 10 is a circuit connection diagram of the shunt cooling state of the third embodiment of the DC power supply system in a high power mode.

In addition, when the temperature detection device of the battery data exchange module 17 detects that the temperature of a certain battery module is higher than a specific threshold, the current flowing through the over-temperature battery module can also be reduced by paralleling the same number of battery modules, so as to achieve the purpose of shunt cooling. FIG. 9 is a circuit connection diagram of the shunt cooling state of the third embodiment of the DC power supply system in a low power mode. As shown in FIG. 9, the current flowing through the battery module can be reduced by half by paralleling another set of two series-connected battery modules on two series-connected battery modules, thus greatly reducing the heat generation. FIG. 10 is a circuit connection diagram of the shunt cooling state of the third embodiment of the DC power supply system in a high power mode. As shown in FIG. 10, the current flowing through the battery module can be reduced by half by paralleling another set of two series-connected battery modules on two series-connected battery modules, so that the heating capacity of the battery module in the power supply state can be greatly reduced (about ¾). Preferably, the remaining power and internal resistance of the two sets of battery modules participating in the parallel connection are roughly the same.

In the DC power supply system 10 of the invention, the base 12 further includes a battery module cooling device, when the temperature detection device detects that the temperature of a certain battery module 13I is lower than a specific threshold, corresponding information will be displayed on the display device to remind the user to start the battery module cooling device or the system automatically starts the battery module cooling device.

In the DC power supply system 10 of the invention, the base 12 further includes a battery module heating device, when the temperature detection device detects that the temperature of the battery module 13I is lower than a specific threshold value, it will make a corresponding display on the display device to remind the user to start the battery module heating device to heat the battery or the system automatically starts the battery module heating device. The fixed battery pack unit 11 can also be heated by a certain battery module 13I to improve the low temperature performance of the fixed battery pack unit 11.

In the DC power supply system 10 of the invention, the battery module cooling device is a coolant flow circulation system mounted between the mounting positions or a coolant flow circulation system mounted on the back of the base.

In the DC power supply system 10 of the invention, the monomer cells that make up the fixed battery unit 11 and/or the battery module 13 may be type-18650 battery, type-2170 battery, type-4680 battery, blade battery or solid state battery, etc.

In the present invention, the moving equipment may be a vehicle, an aircraft, or a ship.

In the invention, the circuit connection diagram of the DC power supply system 10 can also be displayed on a display screen (the central display screen of the vehicle or the special display screen of the power supply system itself) to visually display the remaining power and the on-duty/idle status of each battery module. Wherein, the remaining power is displayed by a battery indicator. The battery on duty/in idle state is displayed by color, for example, the battery on duty is displayed in red, and the battery in idle state is displayed in gray. Therefore, users are reminded to properly arrange the use of batteries and the plan of charging and replacing. The user can select by the touch screen, or call a corresponding mode through voice input.

In the invention, the external data exchange module 15 may also obtain relevant data from the Internet of Vehicles, navigation software, etc., such as road condition information data, speed limit data of specific road sections, traffic control information data, etc.

The invention also provides a battery module charging system, including a DC power supply, a battery mounting position, a control system, a data exchange system and a display system, wherein fees are collected based on the charging degrees and the time occupied by battery charging.

In the battery module charging system of the invention, the battery module composed of a plurality of element battery cells is connected with the electrode set on the battery slot through its own attached electrode.

In the battery module charging system of the invention, the battery slot into which the battery is inserted is identified, and the battery brand, service history, remaining life, remaining power and corresponding recommended price are displayed.

In the battery module charging system of the invention, there is also a payment system through which users can charge or trade the batteries.

The content recorded above is only the specific implementation of the invention. The scope of protection of the invention is not limited to this. Any variation or substitution that can be easily thought of by a technician familiar with this technical field within the scope of disclosure of the invention shall be covered by the scope of protection of the claims of the invention.

What is claimed is:

1. A DC power supply system, comprising a fixed battery pack unit and a variable battery pack unit, the variable battery pack unit including:

a plurality of battery modules, which are respectively formed by combination and packaging of a plurality of monomer cells, with a battery module electrode and a battery module data exchange interface outside;

a base, which is provided with a plurality of battery mounting positions, for accepting the plurality of battery modules, and each of the battery mounting positions is provided with a base electrode terminal electrically connected with the battery module electrode of the battery module, and a base data exchange interface connected with the battery module data exchange interface;

a power supply mode switching module, which is equipped with a selector switch and a switch controller, the selector switch is set corresponding to the battery mounting position, and the use and idle of the battery module mounted on the battery mounting position is selected based on the control of the switch controller;

an external data exchange module, which is connected with an electronic control unit of the moving equipment driven by the DC power supply system and carries out data exchange; and a battery control module, which is connected with the external data exchange module and the switch controller, and dynamically selects one or more of the battery modules to put them in an operating state based on the information input from the external data exchange module.

2. The DC power supply system of claim 1, characterized in that, the battery control module controls the power supply mode switching module to make the DC power supply system operate in a plurality of power supply modes, which include the mode of using only a few of the battery modules in the variable battery pack unit, the mode of using most of the battery modules in the variable battery pack unit, the mode of using the fixed battery pack unit and combination thereof.

3. The DC power supply system of claim 1, characterized in that, the external data exchange module receives the power supply demand data transmitted by the Internet of Vehicles or the electronic control unit, the power supply demand data includes the current road condition data of the moving equipment, the current driving behavior data of the driver, the vehicle speed data, the vehicle acceleration data, the brake pedal status data and the accelerator pedal status data.

4. The DC power supply system of claim 3, characterized in that, the power supply demand data also includes the data after processing the historical road condition data, the driver's historical driving habits data and the current road condition data based on the artificial intelligence algorithm.

5. The DC power supply system of claim 1, further including:

a data storage module, which records the on-duty status and use history of each battery module in the plurality of battery modules, so as to obtain the on-duty status data and use history data of each battery module in the plurality of battery modules, store in the data storage module, and via the call of the electronic control unit of the moving equipment, display the on-duty status and use history of each battery module on a display screen.

6. The DC power supply system of claim 5, characterized in that, a user of the moving equipment selects to use a combination of certain battery modules based on personal driving preferences according to the displayed on-duty status and use history of certain battery modules, and stores the selected combination in the data storage module as a custom mode.

7. The DC power supply system of claim 5, characterized in that, a user of the moving equipment selects to use a combination of certain battery modules based on the road condition according to the displayed on-duty status and use history of certain battery modules, and stores the selected combination in the data storage module as a user-defined mode.

8. The DC power supply system of claim 5, characterized in that, the battery control module selects to use a combination of certain battery modules according to the road condition and based on the on-duty status and use history of certain battery modules, and stores it in the data storage module as a system-defined mode.

9. The DC power supply system of claim 5, further including:

an AI machine learning module, the battery control module selects to use a combination of certain battery modules according to the on-duty status and use history of certain battery modules, combined with the driver's habits, and based on the algorithm of artificial intelligence, and recommends it to the user for selection, and prompts the user to save.

10. The DC power supply system of claim 1, characterized in that, the battery control module automatically switches the battery power supply mode according to the input road condition data, and selects the power supply mode using only a few of the battery modules when the sensor of the moving equipment driven thereby detects the road congestion ahead, and automatically switches to the power supply mode that combines part of the battery module with the fixed battery pack unit when the sensor of the driven moving equipment detects that the road ahead is clear.

11. The DC power supply system of claim 1, characterized in that, the battery control module automatically switches the battery power supply mode according to the input accelerator pedal status data, and immediately switches to the power supply mode that combines part of the battery module with the fixed battery pack unit after judging that the accelerator pedal is pressed for a fixed time.

12. The DC power supply system of claim 1, characterized in that, the battery control module automatically switches the battery power supply mode according to the input vehicle speed data, and switches to the power supply mode in which only a few of the battery modules being used when determining that the vehicle speed reaches the predetermined speed.

13. The DC power supply system of claim 1, characterized in that, the battery control module automatically switches the battery power supply mode according to the road condition, and when the sensor of the driven moving equipment detects the road condition that allows the driver to overtake or merge, switches to the power supply mode that combines part of the battery module with the fixed battery pack unit.

14. The DC power supply system of claim 9, characterized in that, the battery control module uses machine learning and deep learning to form a combination mode that conforms to the user's driving preferences based on the previous road data and the user's driving habits data, and automatically applies to the current battery control.

15. The DC power supply system of claim 9, characterized in that, the battery control module uses the model of machine learning and deep learning, based on the previous road data and the user's driving habits data, forms a combination mode that conforms to the user's driving preferences, and displays and recommends to the user for selection.

16. The DC power supply system of claim 1, characterized in that, a circuit connection diagram of the power supply system is displayed on a display screen of the moving equipment, and the on-duty or idle status of each battery module is displayed with specific colors or graphics.

17. The DC power supply system of claim 1, characterized in that, the moving equipment is a vehicle, an aircraft, or a ship.

18. A battery module charging system, for charging the battery module of the DC power supply system of claim 1, further including a DC power supply, a battery mounting position, a control system, a data exchange system and a display system, and the battery module charging system collects fees based on the charging degrees of the battery module and the time occupied by battery charging.

19. The battery module charging system of claim 18, characterized in that, the battery module composed of a plurality of element battery cells is connected with the electrode set on the battery mounting position through its own attached electrode.

20. The battery module charging system of claim 18, characterized in that, the battery module inserted in the battery mounting position is identified, and the brand, service history, remaining power, remaining life and corresponding recommended price of the battery module are displayed.

21. The battery module charging system of claim 18, further including a payment system through which users can charge or trade the battery modules.

* * * * *